United States Patent [19]

Delphia et al.

[11] Patent Number: 4,867,498
[45] Date of Patent: Sep. 19, 1989

[54] OVERHEAD CONSOLE ASSEMBLY

[75] Inventors: John B. Delphia, Milford, Mich.; Louis Heilenah, Windsor, Canada; Ronald E. Chandler, Walled Lake, Mich.

[73] Assignee: Chivas Products Limited, Sterling Heights, Mich.

[21] Appl. No.: 279,490

[22] Filed: Dec. 2, 1988

[51] Int. Cl.$^4$ .............................................. B60R 5/00
[52] U.S. Cl. ................................ 296/37.7; 296/37.8; 224/311; 224/42.42; 220/334; 248/160; 248/104; 248/274
[58] Field of Search ............... 296/37.7, 37.8, 37.1; 224/42.42 R, 282, 277, 278, 309, 311 X, 312; 206/5 R, 6; 220/23, 334, 333, 329; 248/160 X, 104 X, 274 X

[56] References Cited

U.S. PATENT DOCUMENTS

| | | | |
|---|---|---|---|
| 3,773,378 | 11/1973 | Lewis | 296/37.8 |
| 4,079,987 | 3/1978 | Bumgardener | 296/37.7 |
| 4,100,372 | 7/1978 | Hypolite | 296/37.7 |
| 4,101,159 | 7/1978 | Stewart | 296/37.7 |
| 4,241,870 | 12/1980 | Marcus | 296/37.7 |
| 4,368,937 | 1/1983 | Palombo et al. | 296/37.7 |
| 4,469,365 | 9/1984 | Marcus et al. | 296/37.7 |
| 4,595,228 | 6/1986 | Chu | 296/37.7 |
| 4,818,010 | 4/1989 | Dillon | 296/37.7 |

Primary Examiner—Robert R. Song
Attorney, Agent, or Firm—Townsend and Townsend

[57] ABSTRACT

An overhead console (2) attaches to the interior roof (4) of a motor vehicle and provides various features including a retractable compartment (18) for sunglasses or the like that with a damper mechanism (118) for protecting the sunglasses (61) when the compartment (18) is opened. Another compartment (22) is used to hold a remote control unit (60) for a garage door opener. The control unit compartment (18) permits the remote unit (60) to be used by pressing a pushbutton (24) on the compartment lid (23) which activates a pushbutton (62) on the unit (60). A reading/map lamp assembly (28) is houseable in the console (2) and includes a plastic bellows (30) for retracting and aiming a lamp head (32) over a 360° range. The lamp beam width is optionally controllable by a secondary bellows (74) mounted on the lamp head (38). A dual-sided access compartment permits the vehicle driver or a passenger to gain access to a common compartment. The dual-sided compartment (38) includes a pair of pivot/latch rod assemblies (76, 77) that work in a complementary manner such either assembly can act as a release latch permitting the compartment (38) to hinge open about the remaining assembly. The console (2) optionally includes a panel (14) for mounting instruments (17) such as a clock, a compass, and the like.

42 Claims, 7 Drawing Sheets

OVERHEAD CONSOLE ASSEMBLY

BACKGROUND OF THE INVENTION

The invention pertains to overhead console assemblies for mounting within a motor vehicle, and more particularly to such assemblies capable of providing storage a light source and retaining a remote control unit for a garage door opener.

Overhead console assemblies are known in the art. For example. Hypolite, U.S. Pat. No. 4,100,372 discloses an assembly that provides a dome-like light source and retains audio equipment or a CB transmitter for use by the driver of a motor vehicle. Marcus et al.. U.S. Pat. No. 4,469,365 recognizes that passengers, as well as the driver, may require access to overhead storage and provides a sun glass storage console with compartments reachable from all seats in the vehicle.

What is needed is a console assembly that provides a common storage compartment accessible to the driver or a passenger, that provides a retractable-aimable lamp with an adjustable beam, and that provides a compartment for concealably retaining a remote control unit for a garage door opener, while allowing the unit to be activated in the concealed position. Further, such an assembly should provide a separate compartment for storage of sun glasses and the like. and should allow the display of instruments useful to the vehicle occupants.

SUMMARY OF THE INVENTION

The present invention is an overhead console for mounting to the interior roof of a motor vehicle. The console preferably includes a compartmentalized housing for: (1) displaying an overhead instrument panel; (2) retractably stowing an aimable reading/map lamp assembly whose beam width may be controlled; (3) mounting a dual-sided storage access compartment; (4) providing a separate storage box for sunglasses or the like and (5) concealably retaining a remote control unit for a garage door opener, while allowing the unit to be operated in its concealed disposition. It is not necessary that a single embodiment encompass all of the features listed above. An embodiment especially suitable for compact vehicles might, for example, eliminate the dual-sided storage access compartment. The various components optionally included in the present invention will now be summarized individually.

The console may include a panel for mounting instruments such as a clock. a compass, a thermometer.

A lamp compartment and a reading/map lamp assembly retractably stowable therein may be included in the console. The lamp assembly includes a lamp head assembly (typically a lamp head, a reflector, a light bulb socket and bulb and a heat diffuser) and a tubular plastic bellows. One end of the bellows is attached to the lamp compartment and the other end is attached to the lamp head. The bellows may, accordion style, be contracted, expanded or left in an intermediate position depending upon whether the lamp head is to be stowed. fully withdrawn or partially withdrawn. The flexible bellows also permits the lamp head to be rotated. providing a lamp beam aimable over a 360° range. In a preferred embodiment, the lamp head assembly further includes a bellows-like lamp shade for varying the beam width emitted by the light bulb. A reading/map lamp according to the present invention may be stowed or withdrawn and aimed at a map or other object with little or no distraction to the vehicle driver.

The console may also include a dual-sided storage access compartment for providing storage that is pivotally accessible. left-to-right or right-to-left for use by the driver or a passenger in the vehicle. The compartment includes a pair of retractable pivot/latch rods extending longitudinally on the left and right side of the compartment. The pivot/latch rods are activated respectively. by a left or right latch cam. The pivot/latch rods function interchangeably: when the left latch cam is rotated (thus functioning as an opening latch), the left pivot/latch is retracted. which permits the dual-sided storage access compartment to swing open about the right pivot/latch which functions as a pivot. Conversely, when the right latch cam is rotated. the compartment swings open about the left pivot/latch. The pivot/latch rods include a spring and worm gear surface. while the latch cams include camming surfaces which cause the pivot/latch rods to retract when the latch cams are rotated. Downward rotation of the unlatched compartment is limited by a pair of restricting cables. However if both cables are removed. rotating both latch cams will permit the dual-sided storage access compartment to be removed from the console housing for cleaning or other purposes.

The storage box for sunglasses or the like includes a lid whose upper-most surface includes sub-compartments for receiving sunglasses and the like. The lid is hingedly attached to the console housing and. when the box is stowed, the bottom-most surface of the lid is substantially flush with the lower surface of the console housing. The storage box preferably includes a damper. connected between the lid and the console housing. to slow the rate at which the lid opens, thereby protecting objects in the sub-compartments. The sub-compartments are shaped such that when the lid is open, gravity maintains the stored objects within the sub-compartments. A sub-compartment surface optionally includes U-shaped clasps for retaining pens. pencils and similar items.

The console optionally includes a concealed compartment for retaining a remote control unit for a garage door opener. The compartment includes a removable compartment lid which. in normal use. is substantially flush with the lower surface of the console housing. The garage door opener may be secured with foam pads and Velcro brand straps to the upper-most surface of the lid, and is thereby concealably secured within the compartment. The lid includes a push-button which when pushed engages an activating button on the garage door opener. In this manner, the garage door opener may be activated by the push-button without opening the lid.

To recapitulate, the present invention advantageously provides an overhead console that may include a panel for displaying instruments a retractable, aimable reading/map lamp, a dual-sided storage access compartment, a separate compartment for sunglasses or the like, and a concealable compartment for storing and activating a remote control for a garage door opener. Other features and advantages of the invention will appear from the following description. wherein a preferred embodiment is set forth in detail.

DETAILED DESCRIPTION OF THE PREFERRED EMBODIMENT

Figure 1:
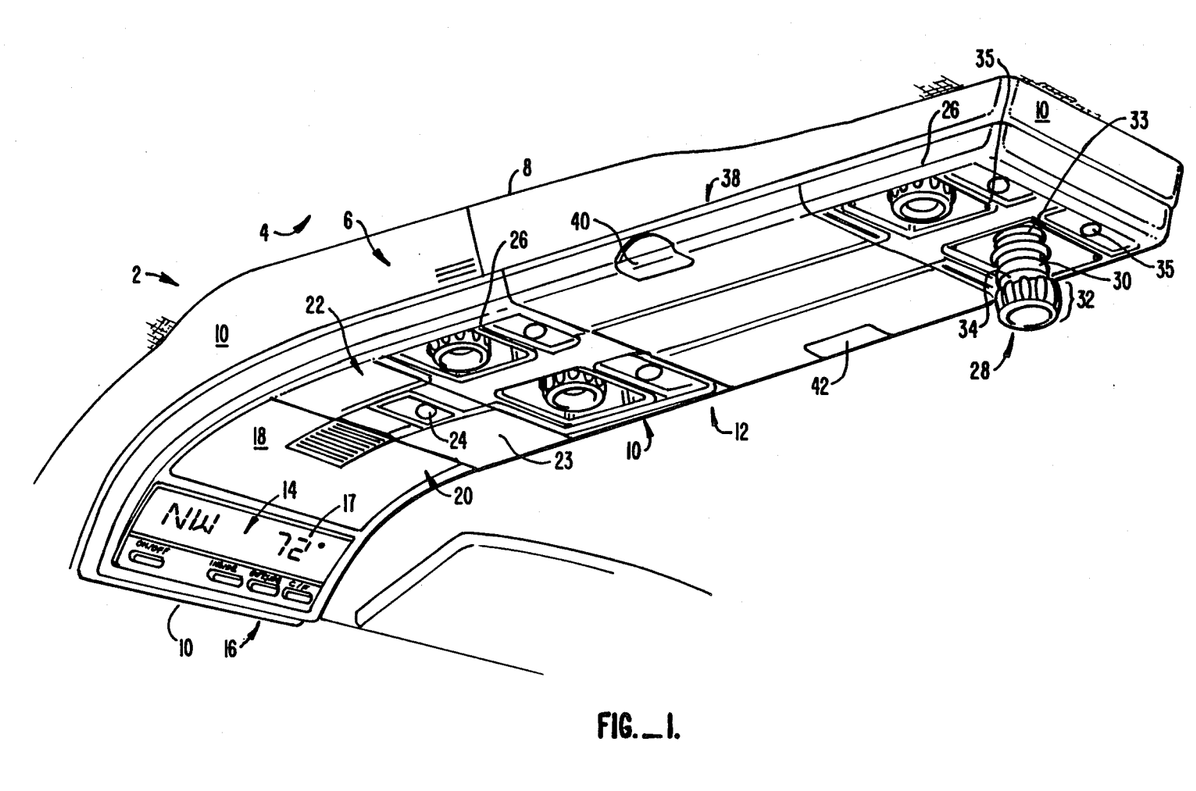
FIG. 1 is an upwardly and forwardly looking perspective view of a preferred embodiment of an overhead console according to the present invention.
Figure 2:
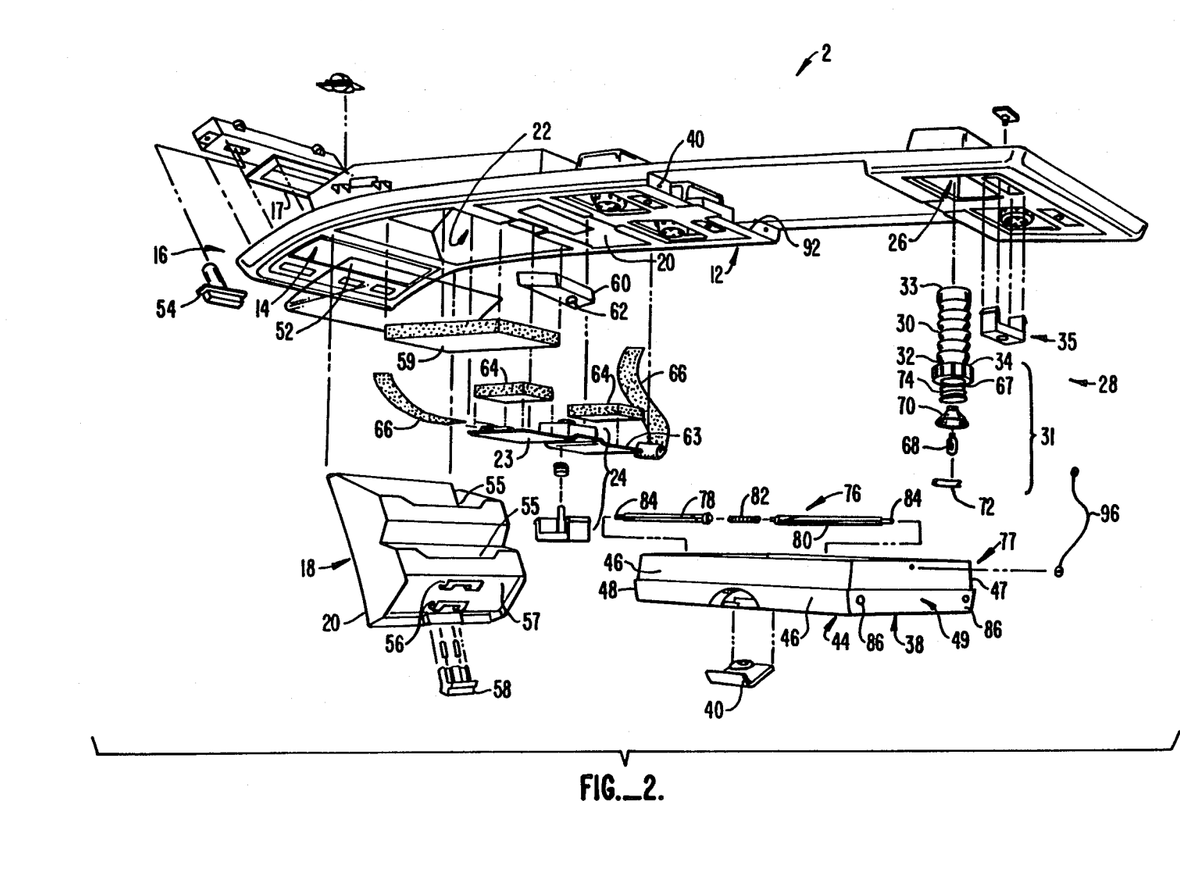
FIG. 2 is an exploded view of the overhead console shown in FIG. 1.

FIGS. 1 and 2 show an overhead console 2 attached to the interior surface of an automobile roof 4. Console 2 includes a housing 6 having an upper surface 8 that conforms to the curvature of interior roof 4. Housing 6 further includes four sides 10 and a lower surface 12 having a curvature generally conforming to the curvature of the interior roof 4.

Housing 6 and lower surface 12 define several specialized regions. An instrument display panel 14 is located at the front end 16 of console 2 and may be used to mount instruments 17 such as a clock. a digital thermometer or the like. such that the instruments are readily visible to the vehicle driver. Console 2 also includes a compartment 18 concealable by a hinged lid 20 for retaining sunglasses or the like therein.

The embodiment of FIGS. 1 and 2 further includes a compartment 22 for concealably storing a remote control unit 60 for a garage door opener. Remote control unit 60 is mounted against the upper-most surface of compartment lid 23. lid 23 being substantially flush with the lower surface 12 of console housing 6. Lid 23 includes a pushbutton mechanism 24 which. when pushed, presses against the activating button 62 on remote control unit 60. In this manner, unit 60 may be activated without opening lid 23 to gain access to compartment 22.

Console 2 further includes one or more retaining compartments 26 wherein a reading/map lamp assembly 28 may be stowed or withdrawn for use. Lamp assembly 28 includes a plastic tubular bellows 30 and a lamp head assembly 31. Assembly 31 includes a lamp head 32, a reflector 70. a light bulb socket 176 and light bulb 68 and a heat shield 72. End of bellows 30 is attached to compartment 26. while end 34 of the bellows 30 is attached to lamp head 32. This structure permits the lamp head 32 to be stowed in compartment 26 by compressing bellows 30, or to be partially or fully withdrawn by expanding bellows 30, accordion style. Because bellows 30 is flexible, lamp head 32 may be aimed over 360°. Adjacent each compartment 26 is a switch 35 for turning each lamp assembly 28 on or off.

Console 2 also includes a dual-sided storage access compartment 38 having first and second latch-cams 40, 42 for gaining access to compartment 38. Compartment 38 includes a bottom 44. first and second oppositely disposed sides 46, 46. and third and fourth oppositely disposed sides 48, 49.

According to FIG. 2, the various instruments 17 are visible to the vehicle driver through a protective window 52. A pushbutton switch 54 is optionally included for activating the display instruments 17.

Figure 3:
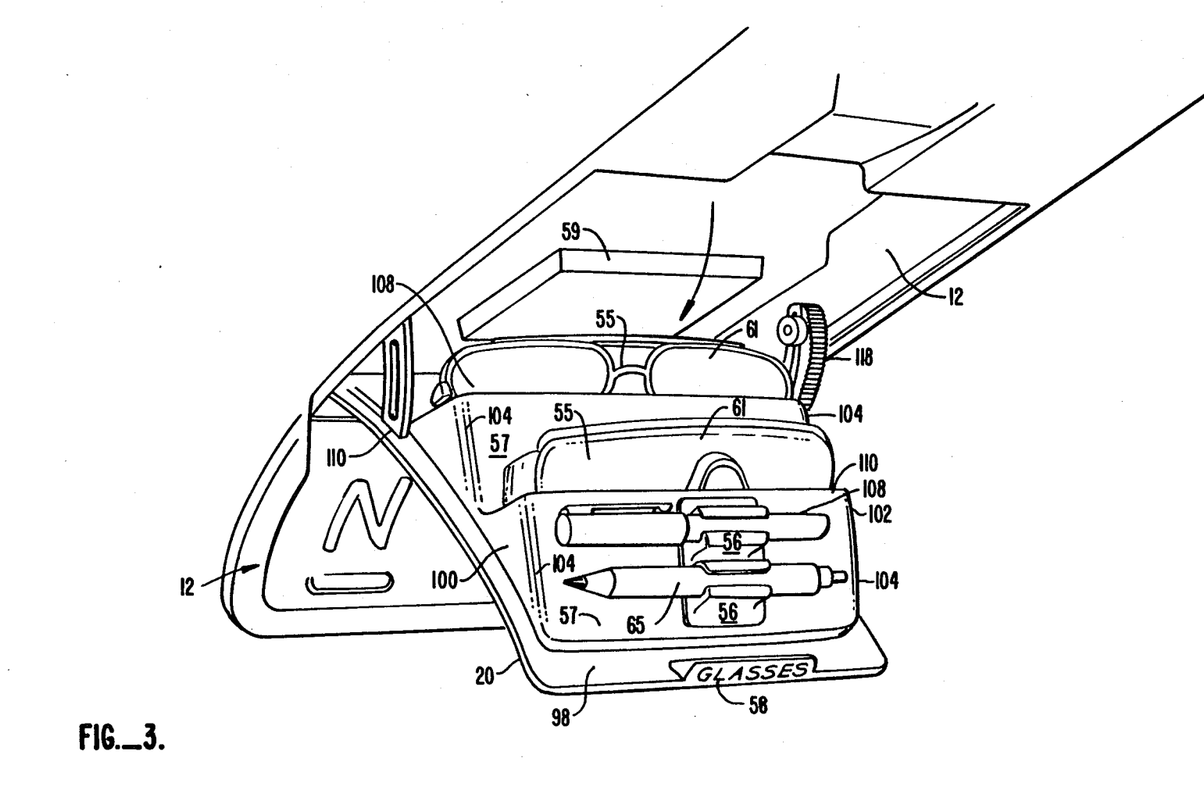
FIG. 3 is a perspective view of the sunglasses storage compartment shown in FIG. 1 and FIG. 2.

As seen in FIGS. 2 and 3. lid 20 of compartment 18 defines. in the embodiment shown. two sub-compartments 55 wherein sunglasses 61 or the like are stored. Optionally, clasping members 56 may be included on a surface of transverse members 57 of one or more sub-compartments 55 to retain pencils 65 and the like. Lid 20 includes a latch 58 for opening and closing compartment 18. A foam pad 59 is mounted to lower surface 12 of housing 6 above sub-compartments 55 to retain objects stored therein.

Figure 4:
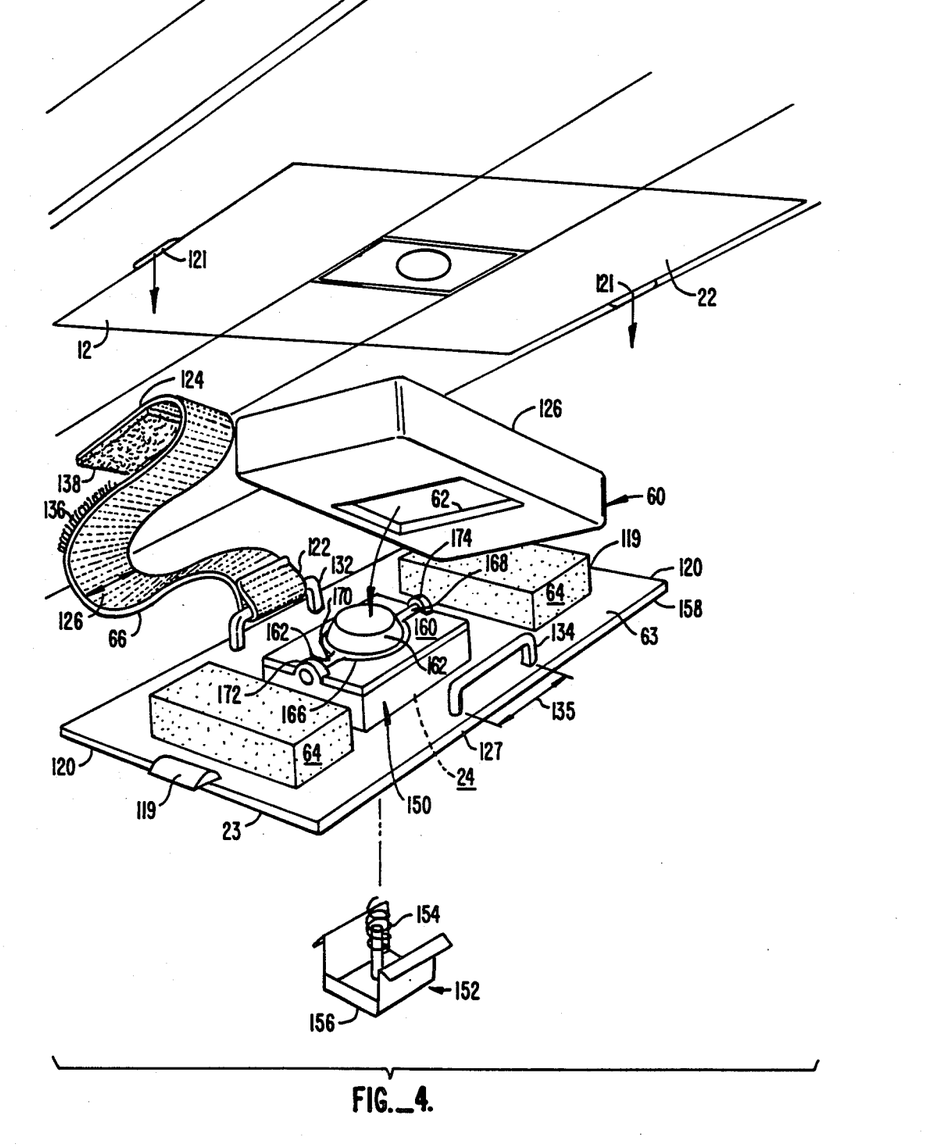
FIG. 4 is an exploded perspective view of a preferred embodiment of a garage door remote control unit compartment according to the present invention.

FIGS. 2 and 4 show remote control unit compartment 22, wherein a remote control unit 60 is stowed. Unit 60 is retained against the upper-most surface 63 of lid 23 by foam pads 64 and a Velcro brand strap 66 such that activator switch 62 contacts the pushbutton mechanism 24 in lid 23, When a user presses mechanism 24. unit 60 is activated, while remaining concealed within compartment 22. In this manner, overhead console 2 is adapted for universal use with existing units 60. Various adapters could be provided for use with different models of commercially available remote control units 60.

FIG. 2 shows lamp assembly 28 of FIG. 1 in detail. Lamp head assembly 31 includes a lamp head 32 including a light bulb socket 67. a bulb 68. a reflector 70 and a heat shield lens 72. In a preferred embodiment, lamp head 32 includes a secondary bellows 74 which serves as a retractable shade suitable for broadening or narrowing the beam of light emitted by bulb 68. Although FIGS. 1 and 2 show a console 2 with four reading/map assemblies 28, it is understood that console 2 may include more or fewer or no such assemblies 28. Of course the particular location of on/off switch 35 may be varied.

FIG. 2 shows the dual-sided access compartment 38 completely detached from housing 6 of console 2. Compartment 38. as seen also in FIGS. 6A and 6D. includes a first hinge pin assembly 76 and an identical second hinge pin assembly 77. First hinge pin assembly 76 includes first and second hinge pin sections 78, 80 resiliently separated by a spring 82, and first latch cam 40 which rotatably engages the first and second hinge pin sections 78, 80 adjacent spring 82. In a preferred embodiment, the distal ends 84 of the hinge pin sections 78, 80 have a narrower diameter than the hinge pin sections per se and extend through openings 86 in the third and fourth sides 48, 49 of compartment 38. The distal ends 84 engage similar sized hole 90 in vertical sections 92 of lower surface 12.

Figure 6A:
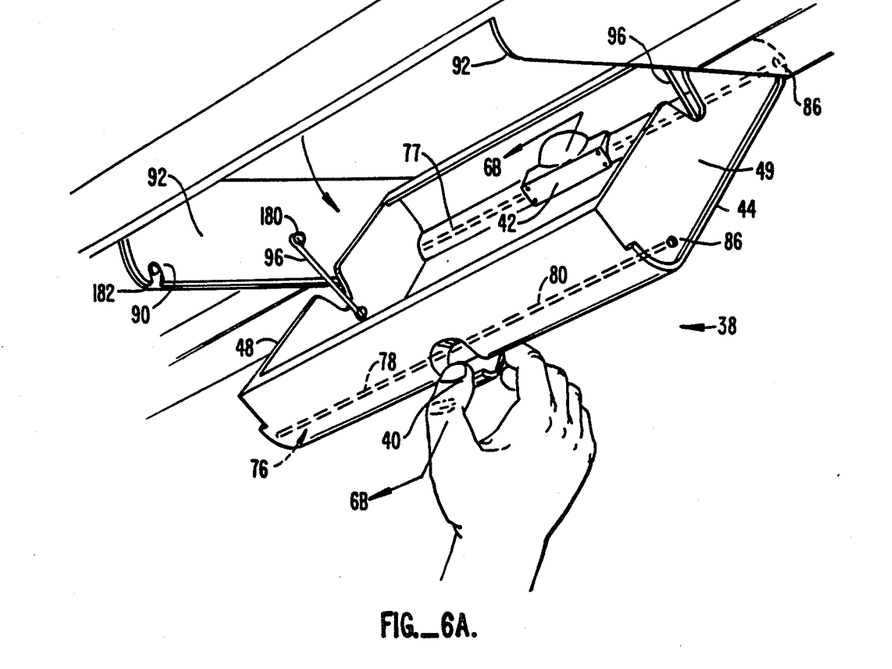
FIG. 6A is a perspective view of a dual-sided storage access compartment according to the present invention.

When latch cam 40 is rotated. a latch-cam mechanism causes first and second hinge pin sections 78, 80 to contract towards the spring 82. withdrawing distal ends 84 from holes 90. As a result. first side 46 of compartment 38 falls free of lower surface 12 and hinges around the second hinge pin assembly 77 which pivotally connects second side 447 of compartment 38 to lower side 12. Conversely, if latch-cam 42 is rotated, hinge pin assembly 77 is caused to contract. and compartment 38 hinges open about the first hinge pin assembly 76. A cable 96 restricts the degree of rotation of compartment 38 about either hinge pin assembly 76 or 77.

FIG. 3 shows the structure of compartment 18 and lid 0 in perspective detail. Sub-compartments 55 are defined by the upper surface 98 of lid 20, stair-step shaped first and second side members 100, 102, and transverse members 57. Transverse members 57 connect together respective riser portions 104 of side members 100. 102. The lower edge 106 of side members 100 and surfaces 57 are affixed to upper surface 98 of lid 20. Alternatively lid 20 and side members 100, 102 and transverse members 57 may be manufactured as a single unit such as by a molding process. Optionally, lid 20, members 100, 192 and surface 57 may be fabricated with a flock surface to minimize the possibility of distracting reflections and to protect the objects stored in sub-compartments 55 against scratches. As noted. surface 57 may optionally include clasping members 56 which define U-shaped profiles and are made of resilient material such as plastic, sized to resiliently admit and grasp a pen or a pencil 108 for storage.

Compartment 18 and housing 6 are connected together by a hinge mechanism 110 which allows compartment 18 to be opened or closed. Compartment 18 and housing 6 are also connected together by a damper mechanism 118 which slows the rate at which compartment 18 opens when latch 56 is engaged, thereby protecting the contents in sub-compartments 55. Hinge mechanism 110 and damper 118 are known in the art and will not be described further except to say that damper mechanism 118 is commonly found on tape cassette doors to retard the rate at which the tape cassette door opens. As noted, the shape of lid 20 is such that when compartment 18 is closed, lid 20 is substantially flush with lower surface 12 of housing 6.

FIG. 4 is an exploded perspective view of the remote control unit compartment 22 shown in FIG. 1 and FIG. 2. Lid 23 is normally attached to housing 6 by means of flexible tabs 119 located. for example. at edges 120, which tabs frictionally engage mating recesses 120 in housing 6. As described earlier. remote control unit 60 is secured to surface 63 of lid 23 by Velcro brand strap 66 having first and second ends 122. 124 and a strap width 128. In the embodiment shown. upper surface 63 of lid 23 includes at opposite edges 128. 130 towel-bar shaped eyelets 132, 134 whose width 134 accommodates width 126 of Velcro strap 66. Velcro end 122 is permanently attached to eyelet 132, and strap 66 is looped about the remote control unit 60, about eyelet 134 and is then looped back upon itself and secured by the mating Velcro surfaces 136. 138. Foam pads 64 are attached to surface 63 of lid 23 with. for example, glue, to accommodate the dimensions of remote control unit 60.

In this manner remote control unit 60 is securely retained against foam pads 64 such that activation of pushbutton mechanism 24 mechanically actuates switch 62 on unit 60. In the embodiment shown in FIG. 4. the lid 23 includes an indentation 150 sized to receive an exterior pushbutton switch 152 and return spring 154. In use. face 156 of switch 152 is substantially flush with the bottommost surface 158 of lid 23. Upper-most surface 160 of rectangular indentation 150 includes a hemispheric region 162 centrally disposed thereon. Hemispheric region 162 is made of an elastomeric material and flexes to push against activator switch 62 on remote control unit 60 when pushbutton switch 151 is pressed. In the embodiment shown, a yoke-like structure 166 is molded with the elastomeric region 162. Yoke-like structure 166 includes first and second tangs 168, 170 which are secured to first and second eyelet-like structures 172, 174 respective. which eyelet-like structures are affixed to surface 160.

Figure 5A:
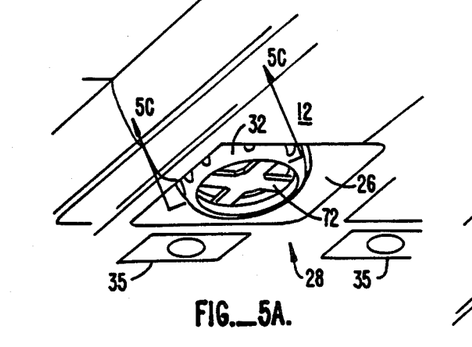
FIG. 5A is a perspective view of a reading/map lamp assembly according to the present invention, showing the lamp in a stowed position.

FIGS. 5A-D show lamp assembly 28 in various configurations. In FIG. 5A. lamp assembly 28 is shown in a stowed position, with bellows 30 fully contracted. such that lamp head 32 is substantially flush with lower surface 12. On/off switch 35 for activating assembly 28 is shown adjacent compartment 26. Bellows 30 is of the type which can be extended and retracted and which can be flexed to point in different directions when extended. One such bellows is made of polypropylane by Tomy Corporation of Carson, Calif. and is sold under the name Popoids Poppity Sets 3908704.

Figure 5B:
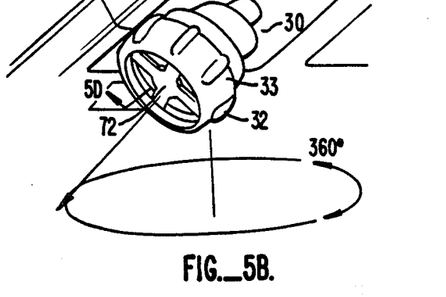
FIG. 5B is a perspective view of the lamp assembly shown in FIG. 5A in an extended angled position.
Figure 5C:
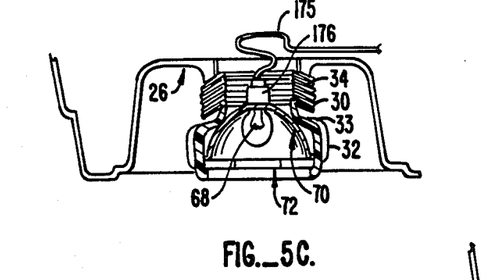
FIG. 5C is a side cross-sectional view of the lamp assembly of FIG. 5A taken along the section line 5C—5C.

In FIG. 5B, bellows 30 is in an extended and twisted disposition allowing a beam of light from lamp head 32 to be aimed 360° in any chosen direction. FIG. 5C is a side view of FIG. 5A, along the line 5C—5C, showing electrical cable 175 connected via on/off switch 35 to socket 176 for providing electricity to light bulb 68 located between diffuser 70 and heat shield 72 within lamp head 32. In the preferred embodiment shown, heat shield 72 is "X" shaped, and dissipates heat from bulb 68 while permitting air circulation and protecting a user's fingers from the hot bulb 68.

Figure 5D:
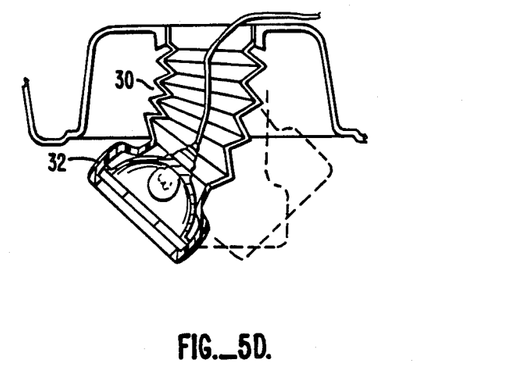
FIG. 5D is a side cross-sectional view of the lamp assembly of FIG. 5B along the section line 5D—5D.
Figures 5E, 5F:
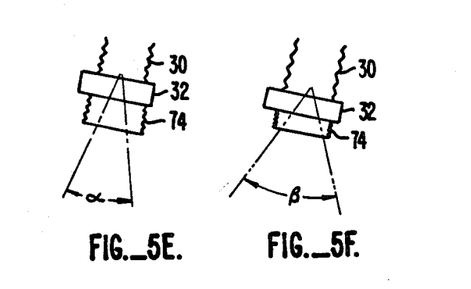
FIG. 5E and FIG. 5F are schematic side views of the reading/map lamp assembly of FIG. 5D with adjustable shade shown in extended and retracted positions.

FIG. 5D shows bellows 30 extended with lamp head 32 in a variety of possible positions, drawn in phantom, that are possible because of the flexible structure of bellows 30. FIGS. 5E and 5F show a preferred embodiment including a secondary bellows 74 which acts as a collapsible lamp shade.

In FIG. 5E, secondary bellows 74 is shown in an extended position. This extended position narrows the effective beam width, represented by angle $\alpha$ as compared to FIG. 5F, wherein the secondary bellows 74 is contracted, thereby increasing the beam width. indicated by angle $\beta$. Thus, the reading/map assembly 28 shown in FIGS. 5E and 5F allows lamp head 32 to be aimed 360° in any direction, and allows the beam width to he controlled with secondary bellows 74. As a result. lamp assembly 28 may be effectively used with minimal distraction to the driver of the motor vehicle wherein console 2 is mounted.

FIG. 6A shows the dual-sided access compartment 38 being opened by depressing latch-cam 40 with the result that compartment 38 pivots open about second hinge pin assembly 77 (indicated in phantom). Compartment 38 includes a bottom 44, first and second sides 46, 47, and third and fourth sides 48, 49. Each retaining cable 96 is connected between a third or fourth side 48, 49 of compartment 38 and a peg 180 in a vertical sidewall 92 of the console housing 6, to prevent compartment 38 from rotating 180° and emptying the contents therein. Vertical side walls 92 also define holes 90 wherein the distal ends 84 of the hinge pin assemblies 76, 77 normally engage. As shown in FIG. 6A, a guide channel 182 extends from the outward perimeter 184 of sidewalls 92 to holes 90. to guide distal ends 84 of hinge pin assemblies 76, 77 into the holes 90.

The camming action associated with the hinge pin assemblies 76, 77 is such that when latch cam 40 is rotated, hinge pin assembly 76 contracts, causing the distal ends 84 of hinge pin assembly 76 to be withdrawn from holes 90 in sidewalls 92. Similarly, when latch cam 42 is rotated. hinge pin assembly 77 contracts, and its distal ends 84 are withdrawn from holes 90 in sidewalls 92. When latch-cam 40 is rotated, compartment 38 pivots about the remaining latch pin assembly 77, and when latch cam 42 is rotated, compartment 38 pivots about latch pin assembly 76. If latch-cams 40 and 42 are both rotated, and cables 96 are detached from pegs 180 compartment 38 will fall free from housing 6 to permit cleaning and the like.

Figure 6B:
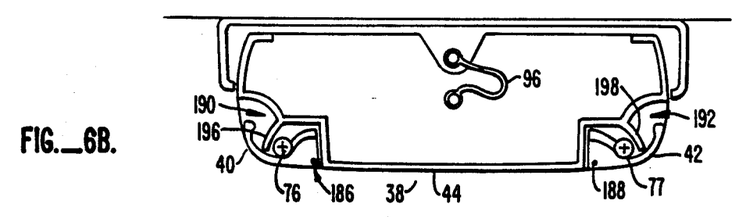
FIG. 6B is a simplified side cross-sectional view of the access compartment of FIG. 6A, when closed along the section line 6B—6B.
Figure 6C:
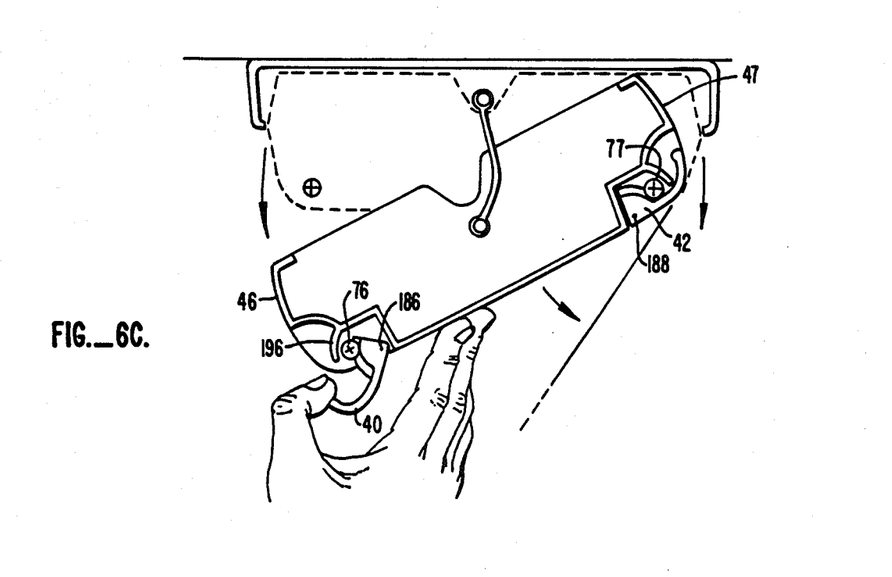
FIG. 6C is a simplified side cross-sectional view of the access compartment of FIG. 6A, when open, along the section line 6B-6B.
Figure 6D:
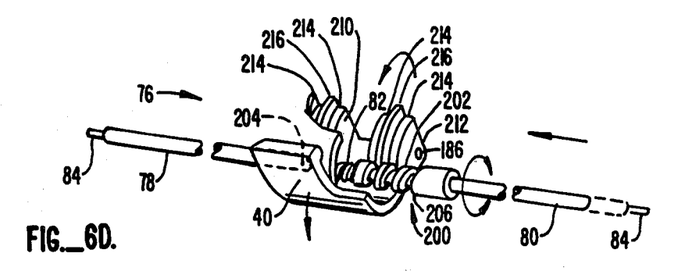
FIG. 6D is a perspective view of a latch cam and pin assembly of FIG. 6C with portions broken away for clarity.

FIGS. 6B and 6C are simplified cross-sectional end views of the compartment 38 shown in FIG. 6A, when the compartment is closed and when the compartment is open, respectively. In FIG. 6B, latch-cams 40 and 42 are each in a closed position with the result- that compartment 38 is maintained in a closed disposition. As shown in FIG. 6B, latch-cams 40, 42 each define an axle hole 186. 188, respectively, perpendicular to a cross-section, as shown. The bottom-most surface 189 of bottom 44 includes lower interior wall members 190. 192 which are parallel to the third and fourth sides 48. 49 of compartment 38 adjacent the latch-cams 40, 42. Latch-cam 40 is pivotally attached to lower interior wall member 190 through axle hole 186. and latch-cam 42 is pivotally attached to lower interior wall member 192 through axle hole 188. The pivotal attachment may include conventional mechanisms such as a pin extending from wall members 190, 192 through axle holes 186. 188. Lower interior wall members 190, 192 further define projecting curved fins 196, 198 disposed, respectively, adjacent and above hinge pin assemblies 76, 77, fins 196 and 198 concealing access openings in sides 46, 47 for latch-cams cams 40, 42.

As shown in FIG. 6C when latch-cam 40 is rotated, thereby retracting or unlatching the first hinge pin assembly 76. container 38 pivots about the second hinge pin assembly 77 which assembly 77 is trapped between fin 198 and latch-cam 42 and acts as a pivot axis. As noted, if latch-cam 42 were rotated, the distal ends 84 of the second hinge pin assembly 77 would retract from holes 90 in wall 92, and fin 196 and latch-cam 40 would trap the first hinge-pin assembly 76, which would then act as a pivot axis for compartment 38.

The construction of latch-cams 40, 42 and the hinge pin assemblies 76, 77 is shown in detail in FIG. 6D. While FIG. 6D shows only latch-cam 40 and first hinge pin assembly 76, it is understood that latch-cam 42 and second hinge pin assembly 77 are identical. With reference to FIG. 6D, first hinge pin assembly 76 includes first hinge pin sections 78 which has a worm gear 200 on its medial end 204, and includes second hinge pin section 80 which has a worm gear 202 on its medial end 206. Separating medial ends 204 and 206 is spring 82. which urges hinge pin sections 78, 80 outwardly such that distal ends 84 will engage their respective holes 90.

With reference to FIG. 6D, latch-cam 40 includes first and second side walls 210. 212. each of which defines a first camming surface 214 that is situated a constant distance away from an axis passing through pivot hole 180. Disposed along a central region of each first camming surface 214 is a projecting camming surface 216 that is situated a slightly greater constant distance away from an axis passing through pivot hole 180. Worm gears 200, 202 engage and press against the first camming surface 214 and the projecting camming surface 216 of latch-cam 40. As a result, when latch-cam 40 is rotated. camming action between surfaces 214, 216 and worm gears 200. 202 causes medial ends 204, 206 of sections 78, 80 to contract. i.e., contracting the first hinge pin assembly 76. whereupon distal ends 84 withdraw from engaging holes 90. By the same token, if latch-cam 42 were rotated. similar camming action would cause contraction of the second hinge pin assembly 77. With reference to FIG. 1. a driver is free to open compartment 38 by rotating latch-cam 40, whereas a front seat passenger is free to open compartment 38 by rotating latch-cam 42. Thus compartment 38 is openable left to right or right to left about the respective second and first hinge pin assemblies 76, 77.

Modifications and variations may be made to the disclosed embodiment without departing from the scope of the invention as defined by the following claims. For instance, an overhead console might include retracting map lights according to the present invention, but no other features, or an overhead console might include a combination of some of the features disclosed herein but not all features.

What is claimed is:

1. An overhead console assembly, for installation within a motor vehicle, the assembly comprising:
   an assembly housing for mounting against the interior roof of the motor vehicle, the assembly housing defining a first compartment; and
   a retractable and aimable lamp assembly, houseable in the first compartment in the assembly housing, the lamp assembly including:
   a lamp head;
   a lamp socket disposed within the lamp head and adapted to receive electricity; and
   a collapsible flexible bellows having a first end attached to the first compartment, a second end attached to the lamp head, and an length therebetween, for disposing the lamp head a variable distance from the first compartment as the bellows is extended or contracted by a user;
   the bellows, when collapsed, permitting the lamp assembly to be stowed within the first compartment, and permitting, when extended, the lamp head to be aimed over a substantially 360° range.

2. The overhead console assembly of claim 1, wherein the lamp head assembly further includes a reflector disposed within the lamp head generally behind the lamp socket.

3. The overhead console assembly of claim 1, wherein the lamp head assembly further includes a shield for protecting a user from touching a light bulb in the lamp socket.

4. The overhead console assembly of claim 1, further including an on/off switch for selectively interrupting a flow of electricity to the lamp socket in the lamp head.

5. The overhead console assembly of claim 1, wherein the bellows is plastic.

6. The overhead console assembly of claim 1, wherein the lamp head further includes a secondary collapsible flexible bellows having a first end mounted to the lamp head, a second free end and a length therebetween;

the secondary bellows mounted such that light from a light bulb in the lamp head passes therethrough;

the secondary bellows, when expanded, limiting the effective beam width of light from a bulb in the lamp head, and the secondary bellows, when contracted, allowing a greater effective beam width; and the light beam width being maximum when the secondary bellows is collapsed, and the light beam width being minimum when the secondary bellows is extended.

7. The overhead console assembly of claim 1, wherein the assembly housing further defines a second compartment for concealably retaining a remote control unit for a garage door opener, the remote control unit having a pushbutton for activating the unit, the overhead console assembly further including:

a removable lid sized to cover the second compartment, including an upper-most surface, a bottom-most surface, and pushbutton means for transmitting force situated on the lid, the bottom-most surface of the lid being substantially flush with the assembly housing when the lid covers the second compartment;

means for removably attaching the lid to the assembly housing for closing the second compartment; and means for releasably securing the remote control unit against the inner-most surface of the lid;

the remote control unit being secured against the lid such that pressure upon the pushbutton means for transmitting force causes the pushbutton on the remote control unit to activate the remote control unit, allowing activation of the remote control unit without opening the lid.

8. The overhead console assembly of claim 7, wherein the assembly housing also includes:

a panel for mounting instruments visible to a driver of the motor vehicle; and an on/off switch for activating an instrument mounted on the panel.

9. The overhead console assembly of claim 7, wherein the pushbutton means for transmitting force includes an elastomeric surface on the lid, and a pushbutton switch situated on the bottom-most surface of the lid;

the elastomeric surface contacting the pushbutton switch on the remote control unit and being responsive to and transmitting force from the pushbutton switch on the lid.

10. The overhead console assembly of claim 9, wherein the elastomeric surface defines a hemisphere extending into the second compartment.

11. The overhead console assembly of claim 10, further including:

a yoke-shaped member having first and second arms, disposed on the upper-most surface of the lid, surrounding the elastomeric hemisphere; and first and second eyelets, disposed on the upper-most surface of the lid, for pivotally retaining the first and second arms of the yoke-shaped member;

the yoke-shaped member retaining the elastomeric hemisphere against the lid.

12. The overhead console assembly of claim 11, wherein the yoke-shaped member is integrally formed with the elastomeric hemisphere.

13. The overhead console assembly of claim 7, wherein the means for releasably securing includes a hook and loop strap looped about the remote control unit and secured at each end of the strap to the upper-most surface of the lid.

14. An overhead console assembly, for use within a vehicle comprising:

a housing defining a first compartment, the compartment having an access opening;

a lid for covering the access opening;

a first hinge latch, mounted to the lid, having a first hinge element selectively moveable between a first hinging position hingedly engaging the housing and a first retracted position free from the housing;

a second hinge latch, mounted to the lid spaced apart from the first hinge latch, having a second hinge element selectively moveable between a second hinging position hingedly engaging the housing and a second retracted position free from the housing;

the lid being pivotable about the first hinge element, thereby exposing the access opening in a first manner, when the first hinge element is in the first hinging position and the second hinge element is in the second retracted position; and the lid being pivotable about the second hinge element, thereby exposing the access opening in a second manner, when the second hinge element is in the second hinging position and the first hinge element is in the first retracted position.

15. The assembly of claim 14, wherein the first and second hinge elements are generally parallel to one another.

16. The assembly of claim 14, wherein the first hinge element includes first and second hinge rods defining a first hinge axis.

17. The assembly of claim 16, wherein the first hinge latch includes means for driving the first and second hinge rods along the first axis as the first hinge latch is moved between the first hinging position and the first retracted position.

18. The overhead console assembly of claim 14, wherein the housing further defines a second compartment for housing a lamp assembly, the lamp assembly including:

a lamp head;

a lamp socket disposed within the lamp head and adapted to receive electricity; and a collapsible flexible bellows having a first end attached to the second compartment, a second end attached to the lamp head, and an length therebetween, for disposing the lamp head a variable distance from the first compartment as the bellows is extended or contracted by a user;

the bellows, when collapsed, permitting the lamp assembly to be stowed within the first compartment, and permitting, when extended, the lamp head to be aimed over a substantially 360° range.

19. The overhead console assembly of claim 18, wherein the lamp head further includes a secondary collapsible flexible bellows having a first end mounted to the lamp head, a second free end and a length therebetween;

the secondary bellows mounted such that light from a light bulb in the lamp head passes therethrough;

the secondary bellows, when expanded limiting the effective beam width of light from a bulb in the lamp head, and the secondary bellows, when contracted, allowing a greater effective beam width; and the light beam width being maximum when the secondary bellows is collapsed, and the light beam width being minimum when the secondary bellows is extended.

20. The overhead console assembly of claim 14, wherein the housing further defines a second compartment for housing a container for receiving a user article, and a third compartment for concealably housing a remote control unit for a garage door opener, the remote control unit having a pushbutton for activating the unit, further including:
a container for receiving a user article, houseable within the first compartment, including:
a lid hingedly attached to the assembly housing for movement between open and closed dispositions, the lid having an upper-most surface and a lower-most surface;
first and second side members, disposed parallel to one another and spaced apart, a lower edge of each side member attached to the upper-most surface of the lid, each side member defining a stair-step profile having a riser portion;
a transverse member, connecting each riser portion of the first side member to a corresponding riser portion of the second side member, a lower edge of the transverse member being attached to the upper-most surface of the lid;
a latch mechanism for retaining the lid in a closed disposition against the assembly housing and for permitting the lid to be hinged open; and
a damper mechanism, connecting the lid to the assembly housing, for slowing the rate at which the lid traverses from the closed disposition to the open disposition when unlatched;
a sub-compartment, sized for receiving the user article, being defined by the upper-most surface of the lid, the side members and the transverse member, the sub-compartment having an open top;
the damper mechanism protecting the user article in the sub-compartment from dislodgment while the lid is placed in an open disposition;
the riser portion of the side members of the subcompartment being so disposed, when the lid is in the open disposition, so as to retain the user article therein by force of gravity;
a removable lid sized to cover the third compartment, including an upper-most surface, a bottom-most surface, and pushbutton means for transmitting force situated on the lid, the bottom-most surface of the lid being substantially flush with the assembly housing when the lid covers the third compartment;
means for removably attaching the lid to the assembly housing for closing the third compartment; and
means for releasably securing the remote control unit against the inner-most surface of the lid;
the remote control unit being secured against the lid such that pressure upon the pushbutton means for transmitting force causes the pushbutton on the remote control unit to activate the remote control unit, allowing activation of the remote control unit without opening the lid.

21. The overhead console assembly of claim 20, wherein the housing further defines a fourth compartment for housing a lamp assembly, the lamp assembly including:
a lamp head;
a lamp socket disposed within the lamp head and adapted to receive electricity; and
a collapsible flexible bellows having a first end attached to the second compartment, a second end attached to the lamp head, and an length therebetween, for disposing the lamp head a variable distance from the fourth compartment as the bellows is extended or contracted by a user;
the bellows, when collapsed permitting the lamp assembly to be stowed within the fourth compartment, and permitting, when extended, the lamp head to be aimed over a substantially 360° range.

22. The overhead console assembly of claim 21, wherein the assembly housing also includes:
a panel for mounting instruments visible to a driver of the motor vehicle; and
an on/off switch for activating an instrument mounted on the panel.

23. An overhead console assembly, for installation within a motor vehicle, the assembly comprising:
an assembly housing for mounting against the interior roof of the motor vehicle, the assembly housing defining a first compartment, the first compartment bounded by first and second spaced apart generally vertical walls, each said wall having a lower edge defining first and second compartment wall openings;
a dual-sided access compartment, houseable in the first compartment between the first and second walls, the dual-sided access compartment including:
first connection means for latching and pivotally attaching the dual-sided access compartment towards the lower edge of the first wall; and
second connection means for latching and pivotally attaching the dual-sided access compartment towards the lower edge of the second wall;
activation of a chosen one of the first and second connection means permitting the dual-sided access compartment to pivot open about the remaining connection means thereby providing access from the first or second side of the dual-sided access compartment.

24. The overhead console of claim 23, wherein each connection means includes:
first and second hinge pin members, each hinge pin member having a distal end and having a medial end defining a worm gear, the distal end of each hinge pin member retractably engaging the assembly housing;
first and second springs, disposed between the medial end of each hinge pin member, for urging the first and second hinge pin members apart;
first and second latch-cams, each having a camming surface pivotally attached to the dual-sided access compartment and in camming contact with the worm gear of the respective first and second hinge pin members;
actuation of a chosen latch-cam causing the corresponding worm gear to disengage the first and second hinge pin members from the assembly housing to permit the dual-sided access compartment to pivot about the remaining hinge-pin members.

25. The overhead console of claim 23, further including a retaining cable connecting the dual-sided access compartment and the assembly housing for limiting the extent to which the dual-sided access compartment pivots open.

26. The overhead console of claim 23, further including means for releasably attaching the retaining cable to the assembly housing.

27. The overhead console of claim 23, wherein the housing further defines a second compartment for housing a lamp assembly, the lamp assembly including:
 a lamp head;
 a lamp socket disposed within the lamp head and adapted to receive electricity; and
 a collapsible flexible bellows having a first end attached to the second compartment, a second end attached to the lamp head, and an length therebetween, for disposing the lamp head a variable distance from the first compartment as the bellows is extended or contracted by a user;
 the bellows, when collapsed, permitting the lamp assembly to be stowed within the first compartment, and permitting, when extended, the lamp head to be aimed over a substantially 360° range.

28. The overhead console of claim 26, wherein the lamp head further includes a secondary collapsible flexible bellows having a first end mounted to the lamp head, a second free end and a length therebetween;
 the secondary bellows mounted such that light from a light bulb in the lamp head passes therethrough;
 the secondary bellows, when expanded, limiting the effective beam width of light from a bulb in the lamp head, and the secondary bellows, when contracted, allowing a greater effective beam width; and
 the light beam width being maximum when the secondary bellows is collapsed, and the light beam width being minimum when the secondary bellows is extended.

29. The overhead console of claim 23, wherein the housing further defines a second compartment for housing a container for receiving a user article, and a third compartment for concealably housing a remote control unit for a garage door opener, the remote control unit having a pushbutton for activating the unit. further including:
 a container for receiving a user article, houseable within the second compartment, including:
  a lid hingedly attached to the assembly housing for movement between open and closed dispositions, the lid having an upper-most surface and a lower-most surface;
  first and second side members, disposed parallel to one another and spaced apart, a lower edge of each side member attached to the upper-most surface of the lid, each side member defining a stair-step profile having a riser portion;
  a transverse member, connecting each riser portion of the first side member to a corresponding riser portion of the second side member, a lower edge of the transverse member being attached to the upper-most surface of the lid;
  a latch mechanism for retaining the lid in a closed disposition against the assembly housing and for permitting the lid to be hinged open; and
  a damper mechanism, connecting the lid to the assembly housing, for slowing the rate at which the lid traverses from the closed disposition to the open disposition when unlatched;
  a sub-compartment, sized for receiving the user article, being defined by the upper-most surface of the lid, the side members and the transverse member, the sub-compartment having an open top;
  the damper mechanism protecting the user article in the sub-compartment from dislodgment while the lid is placed in an open disposition;
  the riser portion of the side members of the sub-compartment being so disposed, when the lid is in the open disposition, so as to retain the user article therein by force of gravity;
 a removable lid sized to cover the third compartment, including an upper-most surface, a bottom-most surface, and pushbutton means for transmitting force situated on the lid, the bottom-most surface of the lid being substantially flush with the assembly housing when the lid covers the third compartment;
 means for removably attaching the lid to the assembly housing for closing the third compartment; and
 means for releasably securing the remote control unit against the inner-most surface of the lid;
 the remote control unit being secured against the lid such that pressure upon the pushbutton means for transmitting force causes the pushbutton on the remote control unit to activate the remote control unit, allowing activation of the remote control unit without opening the lid.

30. The overhead console of claim 29, wherein the housing further defines a fourth compartment for housing a lamp assembly, the lamp assembly comprising:
 a lamp head;
 a lamp socket disposed within the lamp head and adapted to receive electricity; and
 a collapsible flexible bellows having a first end attached to the second compartment, a second end attached to the lamp head, and an length therebetween, for disposing the lamp head a variable distance from the first compartment as the bellows is extended or contracted by a user;
 the bellows, when collapsed, permitting the lamp assembly to be stowed within the first compartment, and permitting, when extended, the lamp head to be aimed over a substantially 360° range.

31. The overhead console assembly of claim 30, wherein the lamp head further includes a secondary collapsible flexible bellows having a first end mounted to the lamp head, a second free end and a length therebetween;
 the secondary bellows mounted such that light from a light bulb in the lamp head passes therethrough;
 the secondary bellows, when expanded, limiting the effective beam width of light from a bulb in the lamp head, and the secondary bellows, when contracted, allowing a greater effective beam width; and
 the light beam width being maximum when the secondary bellows is collapsed, and the light beam width being minimum when the secondary bellows is extended.

32. The overhead console assembly of claim 31, wherein the assembly housing also includes:
 a panel for mounting instruments visible to a driver of the motor vehicle; and
 an on/off switch for activating an instrument mounted on the panel.

33. An overhead console assembly, for installation within a motor vehicle, the assembly comprising:

an assembly housing for mounting against the interior roof of the motor vehicle, the assembly housing defining a first compartment;

a container for receiving a user article, houseable within the first compartment, including:

a lid hingedly attached to the assembly housing for movement between open and closed dispositions, the lid having an upper-most surface and a lower-most surface;

first and second side members, disposed parallel to one another and spaced apart, a lower edge of each side member attached to the upper-most surface of the lid, each side member defining a stair-step profile having a riser portion;

a transverse member, connecting each riser portion of the first side member to a corresponding riser portion of the second side member, a lower edge of the transverse member being attached to the upper-most surface of the lid;

a latch mechanism for retaining the lid in a closed disposition against the assembly housing and for permitting the lid to be hinged open; and a damper mechanism, connecting the lid to the assembly housing, for slowing the rate at which the lid traverses from the closed disposition to the open disposition when unlatched;

a sub-compartment, sized for receiving the user article, being defined by the upper-most surface of the lid, the side members and the transverse member, the sub-compartment having an open top;

the damper mechanism protecting the user article in the sub-compartment from dislodgment while the lid is placed in an open disposition;

the open top of the sub-compartment facing upwardly when the lid is in the open disposition, so as to retain the user article therein by force of gravity;

wherein the assembly housing further defines a third compartment for housing a lamp assembly, the overhead console assembly further including:

a retractable and aimable lamp assembly, houseable in the third compartment in the assembly housing, the lamp assembly including:

a lamp head;

a lamp socket disposed within the lamp head and adapted to receive electricity; and a collapsible flexible bellows having a first end attached to the third compartment, a second end attached to the lamp head, and a length therebetween, for disposing the lamp head a variable distance from the third compartment as the bellows is extended or contracted by a user;

the bellows, when collapsed, permitting the lamp assembly to be stowed within the compartment, and permitting, when extended, the lamp head to be aimed over a substantially 360? range.

34. An overhead console assembly, for installation within a motor vehicle, the assembly comprising:

an assembly housing for mounting against the interior roof of the motor vehicle, the assembly housing defining a first compartment;

a container for receiving a user article, houseable within the first compartment, including:

a lid hingedly attached to the assembly housing for movement between open and closed dispositions, the lid having an upper-most surface and a lower-most surface;

first and second side members, disposed parallel to one another and spaced apart, a lower edge of each side member attached to the upper-most surface of the lid, each side member defining a stair-step profile having a riser portion;

a transverse member, connecting each riser portion of the first side member to a corresponding riser portion of the second side member, a lower edge of the transverse member being attached to the upper-most surface of the lid;

a latch mechanism for retaining the lid in a closed disposition against the assembly housing and for permitting the lid to be hinged open; and a damper mechanism, connecting the lid to the assembly housing, for slowing the rate at which the lid traverses from the closed disposition to the open disposition when unlatched;

a sub-compartment, sized for receiving the user article, being defined by the upper-most surface of the lid, the side members and the transverse member, the sub-compartment having an open top;

the damper mechanism protecting the user article in the sub-compartment from dislodgment while the lid is placed in an open disposition;

the open top of the sub-compartment facing upwardly when the lid is in the open disposition, so as to retain the user article therein by force of gravity; and a foam pad mounted to the assembly housing at a position overlying the open top of the sub-compartment, such that when the lid is in the closed disposition, the foam pad lies against the open top of the sub-compartment, protecting and retaining any user article therein.

35. An overhead console assembly, for installation within a motor vehicle, the assembly comprising:

an assembly housing for mounting against the interior roof of the motor vehicle, the assembly housing defining a first compartment;

a container for receiving a user article, houseable within the first compartment, including:

a lid hingedly attached to the assembly housing for movement between open and closed dispositions, the lid having an upper-most surface and a lower-most surface;

first and second side members, disposed parallel to one another and spaced apart, a lower edge of each side member attached to the upper-most surface of the lid, each side member defining a stair-step profile having a riser portion;

a transverse member, connecting each riser portion of the first side member to a corresponding riser portion of the second side member, a lower edge of the transverse member being attached to the upper-most surface of the lid;

a latch mechanism for retaining the lid in a closed disposition against the assembly housing and for permitting the lid to be hinged open; and a damper mechanism, connecting the lid to the assembly housing, for slowing the rate at which the lid traverses from the closed disposition to the open disposition when unlatched;

a sub-compartment, sized for receiving the user article, being defined by the upper-most surface of the lid, the side members and the transverse member, the sub-compartment having an open top;

the damper mechanism protecting the user article in the sub-compartment from dislodgment while the lid is placed in an open disposition;

the open top of the sub-compartment facing upwardly when the lid is in the open disposition, so as to retain the user article therein by force of gravity; and a writing instrument clasping member attached to an outwardly facing surface of the transverse member.

36. An overhead console assembly, for installation within a motor vehicle, the assembly comprising:

an assembly housing for mounting against the interior roof of the motor vehicle, the assembly housing defining a first compartment and a second compartment for concealably retaining a remote control unit for a garage door opener, the remote control unit having a pushbutton for activating the unit;

a container for receiving a user article, houseable within the first compartment, including:

a lid hingedly attached to the assembly housing for movement between open and closed dispositions, the lid having an upper-most surface and a lower-most surface;

first and second side members, disposed parallel to one another and spaced apart, a lower edge of each side member attached to the upper-most surface of the lid, each side member defining a stair-step profile having a riser portion;

a transverse member, connecting each riser portion of the first side member to a corresponding riser portion of the second side member, a lower edge of the transverse member being attached to the upper-most surface of the lid;

a latch mechanism for retaining the lid in a closed disposition against the assembly housing and for permitting the lid to be hinged open; and a damper mechanism, connecting the lid to the assembly housing, for slowing the rate at which the lid traverses from the closed disposition to the open disposition when unlatched;

a sub-compartment, sized for receiving the user article, being defined by the upper-most surface of the lid, the side members and transverse member, the sub-compartment having an open top;

the damper mechanism protecting the user article in the sub-compartment from dislodgment while the lid is placed in an open disposition;

the open top of the sub-compartment facing upwardly when the lid is in the open disposition, so as to retain the user article therein by force of gravity;

a removable lid, sized to cover the second compartment, including an upper-most surface, a bottom-most surface, and pushbutton means for transmitting force situated on the lid, the bottom-most surface of the lid being substantially flush with the assembly housing when the lid covers the second compartment;

means for removably attaching the lid to the assembly housing for closing the second compartment; and means for releasably securing the remote control unit against the inner-most surface of the lid;

the remote control unit being secured against the lid such that pressure upon the pushbutton means for transmitting force causes the pushbutton on the remote control unit to activate the remote control unit, allowing activation of the remote control unit without opening the lid.

37. The overhead console assembly of claim 33, wherein the lamp head includes a secondary collapsible flexible bellows having a first end mounted to the lamp head, a second free end and a length therebetween;

the secondary bellows mounted such that light from a light bulb in the lamp head passes therethrough;

the secondary bellows, when expanded, limiting the effective beam width of light from a bulb in the lamp head, and the secondary bellows, when contracted allowing a greater effective beam width;

the light beam width being maximum when the secondary bellows is collapsed, and the light beam width being minimum when the secondary bellows is extended.

38. The overhead console assembly of claim 33, wherein the bellows is plastic.

39. The overhead console assembly of claim 33, wherein the lamp head assembly further includes a shield for protecting a user from touching a light bulb in the lamp socket.

40. The overhead console assembly of claim 33, further including an on/off switch for selectively interrupting a flow of electricity to the lamp socket in the lamp head.

41. The overhead console assembly of claim 33, further including a clasping member, attached to a surface of a transverse member, for holding a writing instrument.

42. The overhead console assembly of claim 36, wherein the assembly housing further includes:

a panel for mounting an instrument visible to a driver of the motor vehicle;

an on/off switch for activating the instrument.

* * * * *